United States Patent [19]

Chaudhuri et al.

[11] Patent Number: 5,322,898
[45] Date of Patent: Jun. 21, 1994

[54] ALKYL VINYL ETHER POLYMERS CONTAINING A LACTAM FUNCTIONALITY

[75] Inventors: Ratan K. Chaudhuri, Butler; Jenn S. Shih, Paramus, both of N.J.

[73] Assignee: ISP Investments Inc., Wilmington, Del.

[21] Appl. No.: 114,127

[22] Filed: Aug. 30, 1993

Related U.S. Application Data

[63] Continuation of Ser. No. 402,376, Sep. 5, 1989, abandoned.

[51] Int. Cl.$^5$ .................................................. C08F 8/30
[52] U.S. Cl. .................................. 525/183; 525/283; 428/475.5
[58] Field of Search ............................ 525/183, 283

[56] References Cited
U.S. PATENT DOCUMENTS

| | | | |
|---|---|---|---|
| 3,978,163 | 8/1976 | Barabas et al. | 525/283 |
| 4,980,419 | 12/1990 | Chaudhuri | 525/183 |
| 5,244,974 | 9/1993 | Chaudhuri et al. | 525/183 |

*Primary Examiner*—Ana L. Carrillo
*Attorney, Agent, or Firm*—Marilyn J. Maue; Joshua J. Ward

[57] ABSTRACT

The invention relates to polymers containing units of the structure

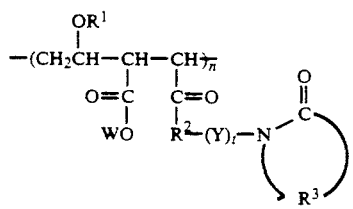

and

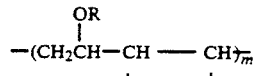

B.

or

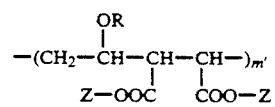

B-1.

or

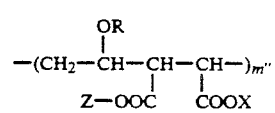

B-2.

or mixtures of A with more than one of B, B-1 and B-2; wherein R and $R^1$ are each independently $C_1$ to $C_{18}$ alkyl;

$R^2$ is oxygen, sulfur or $-NR^5-$;

$R^5$ is hydrogen or lower alkyl;

$R^3$ is alkylene having from 3 to 6 carbon atoms, optionally mono- or di- substituted with lower alkyl;

W is hydrogen, $-NH_4$, an alkali metal or an alkaline earth metal;

Y is alkylene;

Z is hydrogen, $-NH_4$, an alkali metal or an alkaline earth metal or mixtures thereof;

X is lower alkyl, a hydroxy phenyl radical or mixtures thereof;

t has a value of from 2 to 8 and m, m', m" and n independently have a value of from 30 to 3,500 and n represents at least 5 mole percent of the polymeric product. The invention is also releated to the synthesis of the above polymers and to their use as superior adhesives which have significantly improved bond strength.

8 Claims, No Drawings

ALKYL VINYL ETHER POLYMERS CONTAINING A LACTAM FUNCTIONALITY

This is a continuation of application Ser. No. 402,376, filed Sep. 5, 1989, now abandoned.

BACKGROUND OF THE INVENTION

Numerous water soluble polymers and copolymers in commercial use are employed as adhesive coatings and thickeners for various products particularly in the cosmetic and textile finishing arts. However, many of these products are subject to yellowing and do not provide the adhesive bond strength required for certain applications. The interpolymer of alkyl vinyl ether and maleic anhydride in approximately a 1:1 proportion has excellent film forming and adhesive properties. However, the polymer is subject to embrittlement under certain conditions over an extended period of time. Also, this polymer possesses only moderate bond strength when applied to a substrate.

Accordingly, it is an object of this invention to overcome the above deficiencies with polymer having a unique structure and superior properties.

Another object is to enhance the bond strength of alkyl vinyl ether/maleic anhydride copolymers by certain modifications which promote hydrogen bonding.

Another object of this invention is to provide polymers capable of forming clear, non-yellowing films characterized by superior adhesive strength which can be employed in pharmaceutical, cosmetic and textile finishing applications.

Still another object of the invention is to provide an economical and commercially feasible method for the preparation of said polymers.

These and other objects of the invention will become apparent from the following description and disclosure.

THE INVENTION

In accordance with this invention there is provided a novel alkyl vinyl either polymer containing a lactam moiety chemically bonded to the polymeric backbone and having repeating units of the structures:

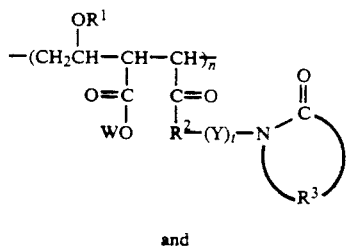   A.

and

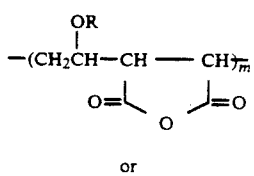   B.

or

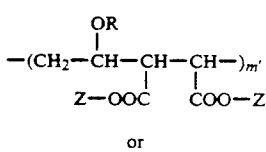   B-1.

or

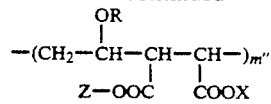   B-2.

or mixtures thereof with unit A wherein R and $R^1$ are each independently $C_1$ to $C_{18}$ alkyl;

$R^2$ is oxygen, sulfur or $-NR^5-$;

$R^5$ is hydrogen or lower alkyl;

$R^3$ is alkylene having from 3 to 6 carbon atoms, optionally mono- or di- substituted with lower alkyl;

W is hydrogen, $-NH_4$, an alkali metal or an alkaline earth metal;

Y is alkylene of linear, branched or cyclic structure;

Z is hydrogen, $-NH_4$, an alkali metal or an alkaline earth metal;

X is a hydroxy phenyl radical, lower alkyl or mixtures thereof;

t has a value of from 2 to 8 and m, m', m" and n independently have a value of from 30 to 3,500 and n represents at least 5 mole percent of the polymer.

The polymers of this invention can have molecular weights up to about 1,000,000; although molecular weights between about 35,000 and about 250,000 are preferred. Also preferred are those polymers wherein $R^3$ is propylene or butylene and n has a value of from about 100 to about 400.

As illustrated above, the lactam is not blended with the interpolymer but is instead chemically bonded to the copolymeric backbone which accounts for the unusually high adhesive strength of the present products as well as their solubility characteristics.

The polymers of the present invention are water soluble and form clear colorless films which are not subject to yellowing over extended periods. The polymers of higher molecular weight, e.g. higher than 75,000, are excellent thickening and gelling agents for many compositions employed in the fields of cosmetics and commercial detergents. The lactam moiety of the polymer contributes conditioning properties when applied to keratinous substrates and have an enduring softening effect. In pharmacetucial and agricultural applications, the low toxicity of the present products recommends their use as complexing agents to provide controlled release of active components. In addition to the above enumerated benefits for drug, cosmetic and agricultural delivery systems, it is found that the present polymer inhibits scale deposits in industrial equipment and piping. While the present polymers are readily soluble in water, they resist attack by many commercial solvents including ethanol, ethyl acetate, tetrahydrofuran, ketones such as acetone, methylethyl ketone and alkanes such as hexane. This property is particularly unexpected since both the lactam and the alkyl vinyl ether/maleic anhydride copolymers are soluble in these solvents. Other general uses include their applications as solubilizers and dispersing agents and will become apparent from this disclosure.

The present polymeric units are randomly or alternatingly disposed; although the polymer may also contain portions of block structure, as when unit A contains a block-like structure. In general, the present copolymers contain at least 5 wt. %, preferably at least 10 wt. %, of the lactam containing unit, and most preferably between about 20% and about 60% by weight of said lactam moiety.

Copolymer A of the present invention, where Z is hydrogen, can be prepared by reacting the alkyl vinyl either-maleic anhydride co-polymer

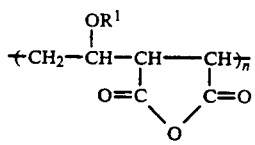     C.

with a lactam of the formula

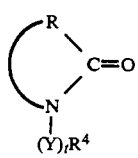     D.

wherein $R^4$ is —OH, —SH, —NH$_2$ or —NHR$^5$ and $R^5$ is lower alkyl. This reaction is carried out at a temperature of from about 20° C. to about 100° C. for a period of from about 20 minutes to about 5 hours under between about 0 and about 50 psig.

Generally, it is recommended that the alkyl vinyl ether/maleic anhydride copolymer, for example GANTREZ® AN, be dissolved in an inert solvent such as for example, methylethyl ketone, ethyl acetate, tetrahydrofuran, acetone, chloroform, etc. and mixtures thereof to provide a solution containing between about 6 and about 30% by weight, preferably between about 15 and about 25% by weight of the copolymer. The lactam is gradually added to this solution either as a solid or as a liquid; although, when the lactam is a solid, it is recommended that it be predissolved in an inert solvent, preferably in the same solvent employed for the copolymer solution. The reaction is carried out in an oxygen-free atmosphere with agitation.

To obtain the corresponding salt of copolymer A, the above half acid product is reacted under similar conditions with a salt forming alkali metal or alkaline earth metal compound such as an oxide, hydroxide or carbonate of said metals or with ammonium hydroxide. Details of these reactions are more completely described in our copending patent application FDN-1772.

On completion of the reaction a solid product precipitate is separated from the reaction mixture by filtration, after which it is washed with the selected solvent and dried for solvent removal. The drying step can be carried out under vacuum or the product can be air dried at room temperature or slightly elevated temperature up to about 60° C. for a period of up to about 20 hours.

Polymers with unit A such as A with at least one of B, B-1 or B-2 can be synthesized by several different reactions.

Procedure I

To obtain the product containing a mixture of A and B units, an excess of reactant C is employed in the above described reaction of C+D. The excess amount of C depends on the proportion of maleic anhydride units desired in the product. By way of illustration, the mole ratio of reactant C to reactant D can vary between about 1:0.1 to about 1:0.9, preferably from about 1:0.3 to about 1:0.7 depending upon the amount of anhydride units to be incorporated with the copolymer in the interpolymeric product.

Procedure II

To obtain the polymer containing A and B-1 or A, B and B-1 units, the above maleic anhydride containing polymer of procedure I is hydrolyzed completely or in part to the corresponding maleic acid. This reaction is also effected under the process conditions given above except that the amount of water or steam or the duration of the reaction can be varied in accordance with the amount of dicarboxylic acid groups desired in the product.

Procedure III

Polymers containing A and B-2 salt or A, B-1 and B-2 salt units are prepared by reacting the above polymer of Procedure II in the completely hydrolyzed state with an inorganic salt forming compound such as an alkali metal, an alkaline earth metal, ammonium or zinc compound such as a hydroxide an oxide, a carbonate and the like. Specific examples include NH$_4$OH, NaOH, KOH, Mg(OH)$_2$, Zn(OH)$_2$, ZnO, CaCO$_3$, K$_2$CO$_3$, Na$_2$CO$_3$, etc. Depending upon the amount of salt forming reactant employed, the acid groups of the resulting polymer are completely converted to salt or only partially converted so that the product contains units of B-1.

Polymeric compositions of units A+B+B-1+B-2 salt or A+B+B-2 salt are also obtainable by reacting the partially hydrolyzed polymer of procedure II with the salt forming compound under similar conditions.

Procedure IV

The metal or ammonium salt polymers of units A+B+B-2 can also be prepared by directly reacting the non-hydrolyzed polymer containing units A+B of procedure I with the inorganic salt forming compound under similar salt forming conditions.

Procedure V

The ester containing polymer of A+B-2 ester or A+B+B-2 ester units is synthesized by reacting the interpolymeric product of Procedure I with an alcohol or with a hydroxy phenyl reactant, such as a C$_1$ to C$_4$ alkanol, phenol, hydroquinol, para hydroxy benzoates etc. Again, partial or complete conversions of the polymeric starting material can be effected by the amount of hydroxy compound employed.

The reactions of procedures I through V are carred out at a temperature of from about 20° to about 100° C. for a period of from about 20 minutes to about 5 hours under between about 0 and abut 100 psig.

Other polymeric combinations of the above defined units will become apparent from the foregoing outline of polymer modification procedures.

As stated above the polymers of this invention are water soluble and form abrasion and organic chemical resistant coatings when applied to a substrate surface. When used in this capacity, coatings of from about 0.1 to about 10 mils thickness are recommended.

Having thus generally described the invention, reference is now had to the accompanying examples which illustrate preferred embodiments of the invention but which are not to be construed as limiting to the scope thereof as more broadly described above and as set forth in the appended claims.

EXAMPLE 1

A 1 liter flask is equipped with a mechanical stirrer, reflux condenser, thermometer, dropping funnel and nitrogen inlet/outlet. Acetone (150 ml) is added to the flask, followed by 78.08 g (0.5 mole) of methyl vinyl ether/maleic anhydride copolymer (GANTREZ® AN-119, having a molecular weight of about 20,000) and 500 ml of ethyl acetate. The reaction mixture is heated to 60° C. for 1 hour with stirring under a blanket of nitrogen. 1-(2-Aminoethyl)-2-pyrrolidone (50.4 g, 0.4 mole) is then added dropwise to the clear solution over a period of 45 minutes whereupon a precipitate is formed. The stirring is continued for an additional 2 hours at 60° C., after which the reaction mixture is cooled to 30° C. and the resulting product precipitate is suction filtered, dried under high vacuum for 8 hours and 124.6 g of product (97% yield) is recovered.

The product conains the following units,

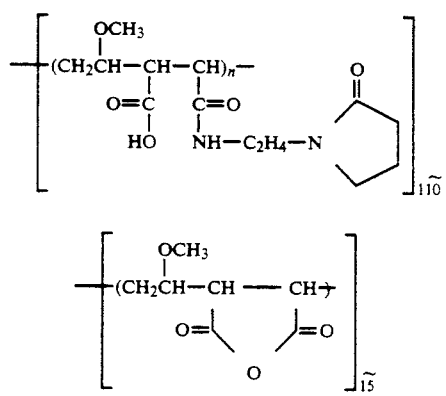

is determined by wet analysis, i.e. titration with 0.1 normal HCl (no free primary amine) and 0.1 normal NaOH after hydrolysis with $H_2O$); nitrogen analysis and spectral analysis (IR, 1H and 13 CNMR).

Based on these analysis about 78% of the anhydride function in GANTREZ® AN-119 is converted to the half amide/acid form.

EXAMPLE 2

The reaction of Example 1 is repeated except that the amount of 1-(2-aminoethyl)-2-pyrrolidone used is 37.8 g (0.3 mole). The product yield is 95.2%. The product contains 40% anhdyride and 60% lactam half acid units.

EXAMPLE 3

The reaction of Example 1 is repeated except that the amount of 1-(2-aminoethyl)-2-pyrrolidone used is 25.2 g (0.2 mole). The product yield is 90.5%, obtained by removing solvent in a rotovap. The product contains 60% anhydride and 40% lactam half acid units.

EXAMPLE 4

The reaction of Example 1 is repeated except that the amount of 1-(2-aminoethyl)-2-pyrrolidone used is 12.6 g (0.1 mole). The product yield is 93.4%, obtained by removing solvent in a rotovap. The product contains 80% anhydride and 20% of the lactam half acid units.

EXAMPLE 5

The reaction of Example 2 is repeated except that the methyl vinyl ether/maleic anhydride copolymer GANTREZ® AN-139 having a molecular weight of about 41,000 is substituted for GANTREZ® AN-119. The product yield is 95.8% and the polymer contains 40% anhydride and 60% lactam half acid units.

EXAMPLE 6

The reaction of Example 4 is repeated except that the methyl vinyl ether/maleic anhydride copolymer GANTREZ® AN-149 having a molecular weight of about 50,000 is substituted for GANTREZ® AN-119. The product yield is 97.2% and the polymer contains 40% anhydride and 60% lactam half acid units.

EXAMPLE 7

The reaction of Example 2 is repeated except that the methyl vinyl ether/maleic anhydride copolymer GANTREZ® AN-149 is substituted. The product yield is 98.1% and the polymer contains 40% anhydride and 60% lactam half acid units.

EXAMPLE 8

The reaction of Example 4 is repeated except that the methyl vinyl ether/maleic anhydride copolymer GANTREZ® AN-149 is substituted. The product is obtained in 93.9% yield and contains 80% anhydride and 20% lactam half acid units.

EXAMPLE 9

The reaction of Example 2 is repeated except that the methyl vinyl ether/maleic anhydride copolymer GANTREZ® AN-169 having a molecular weight of about 67,000 is substituted. The product is obtained in 98.7% yield and contains 40% anhydride and 60% lactam half acid units.

EXAMPLE 10

The reaction of Example 4 is repeated except that the methyl vinyl ether/maleic anhydride copolymer GANTREZ® AN-169 is substituted. The product is obtained in 93.6% yield and contains 80% anhydride and 20% lactam half acid units.

EXAMPLE 11

The reaction of Example 2 is repeated except that the lactam used is 1-(3-aminopropyl)-2-pyrrolidone. The product is obtained in 96.2% yield and contains 40% anhydride and 60% lactam half acid units.

EXAMPLE 12

The reaction of Example 2 is repeated, (same molar basis of lactam to polymer) except that the lactam used is 1-(3-aminopropyl)-2-caprolactam. The product is obtained in 94.8% yield and contains 40% anhydride and 60% lactam half acid units.

EXAMPLE 13

The reaction of Example 1 is repeated, (same molar basis of lactam to polymer) except that the lactam used is 1-(4-aminobutyl)-2-pyrrolidone. The product is obtained in 95.7% yield and contains 20% anhydride and 80% lactam half acid units.

EXAMPLE 14

The reaction of Example 2 is repeated, (same molar basis of lactam to polymer) except that the lactam used is 1-(6-aminohexyl)-2-pyrrolidone. The product is obtained in 96.2% yield and contains 40% anhydride and 60% lactam half acid units.

EXAMPLE 15

The reaction of Example 1 is repeated, (same molar basis of lactam to polymer) except that the lactam used is 1-(6-aminohexyl)-2-pyrrolidone. The product is obtained in 98.3% yield and contains 20% anhydride and 80% lactam half acid units.

EXAMPLE 16

The reaction of Example 1 is repeated, (same molar basis of lactam to polymer) except that the lactam used is 1-(3-aminopropyl)-2-piperidone. The product is obtained in 97.7% yield and contains 20% anhydride and 80% lactam half acid units.

EXAMPLE 17

In a 250 ml beaker, 100 ml water is preheated to about 50° C. and stirred at a speed sufficient to produce a rapidly whirling vortex. The polymer (25 g), obtained from Example 2, is added slowly into the vortex so that the powder is rapidly wet and dispersed. The resulting slurry is then stirred at high speed for about 4 hours until complete solution is achieved. Any water lost by evaporation can be replaced, if desired, at room temperature with gentle stirring. Such solutions are useful in an adhesive paste or as an adhesive solution. Alternately, water can be removed by freeze drying or oven drying under vacuum to obtain a free flowing powder of hydrolyzed polymer containing 40% of the diacid:

$$-(CH_2-CH-CH-CH)_n-$$
with $OCH_3$ on the second carbon, and $HOOC$ and $COOH$ on the third and fourth carbons.

and 60% of the lactam half acid units. Powder products are also useful as an adhesive particularly in affixing a device or material to a mucous membrane.

EXAMPLE 18

The hydrolyzed polymeric product of Example 17 is neutralized to a pH of about 6.5 using a 30% solution of sodium carbonate in water. The solution is allowed to stand for ½ hour at 40°–50° C. to ensure complete mass transfer.

The resulting sodium salt solution of the polymer is drum dried and recovered in 95% yield. The product contains about 80% sodium salt and about 20% free acid.

EXAMPLE 19

The reaction of Example 18 is repeated except that a 30% slurry of sodium carbonate and calcium carbonate is employed as the salt forming compound. The product is about 80% mixed salts of sodium and calcium and 20% free acid.

EXAMPLE 20

The reaction of Example 18 is repeated except that a slurry of zinc oxide is employed as the salt forming compound. The product contains about 85% of the zinc salt and about 15% free acid.

EXAMPLE 21

The polymeric product of Example 1 is treated with butanol in a 1:1 molar ratio with the anhydride moiety at 50° C. for 3 hours. The resulting product is collected by filtration and dried. The product is obtained in 95% yield and contains 80% lactam half acid and 20% of the butyrate of the maleic acid units.

EXAMPLE 22

Films were made on various substrates using a 5% aqueous solution of the product from Example 17 and poly(methyl vinyl ether maleic acid). The films were then vacuum dried overnight in an oven at 45° C. The results are as reported below.

| Film Properties | Product from Ex. 17 | Poly(methyl Vinyl Ether Maleic Acid) |
|---|---|---|
|  | clear, transparent glossy no yellowing after 2 weeks | slightly hazy, less glossy slight yellowing after 2 weeks |
| Adhesion |  |  |
| steel | 100% | 100% |
| Aluminum | 95% | 85% |
| Polypropylene | Formation of film | No film |
| Glass | Formation of film | No film |

What is claimed is:

1. A polymer of alkyl vinyl ether containing the units $$-(CH_2CH-CH-CH)_n- \quad \text{A.}$$
with $OR^1$, $O=C-WO$, $C=O-R^2-(Y)_t-N$ ring with $R^3$ and $$-(CH_2CH-CH-CH)_m- \quad \text{B.}$$
with $OR$, and anhydride $O=C-O-C=O$ or $$-(CH_2-CH-CH-CH-)_{m'} \quad \text{B-1.}$$
with $OR$, $Z-OOC$, $COO-Z$ or $$-(CH_2-CH-CH-CH-)_{m''} \quad \text{B-2.}$$
with $OR$, $Z-OOC$, $COOX$ or mixtures of A with more than one of B, B-1 and B-2; wherein R and $R^1$ are each independently $C_1$ to $C_{18}$ alkyl;

$R^2$ is oxygen, sulfur or $-NR^5-$;

$R^5$ is hydrogen or lower alkyl having from 1 to 4 carbon atoms;

$R^3$ is alkylene having from 3 to 6 carbon atoms, optionally mono- or di- substituted with lower alkyl having from 1 to 4 carbon atoms;

W is hydrogen, $-NH_4$, an alkali metal or an alkaline earth metal;

Y is alkylene;

Z is hydrogen, —NH$_4$, an alkali metal or an alkaline earth metal or a mixture thereof;

X is lower alkyl having from 1 to 4 carbon atoms, a hydroxy phenyl radical, or a mixture thereof;

t has a value of from 2 to 8 and m, m', m" and n independently have a value of from 30 to 3,500.

2. The polymer of claim 1 having the following units

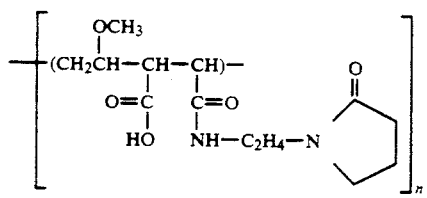

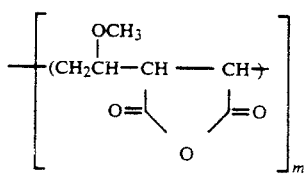

3. The polymer of claim 1 having the following units

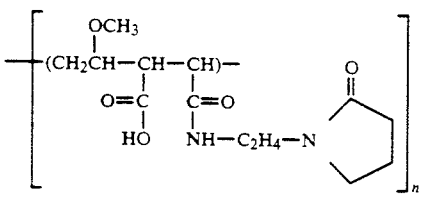

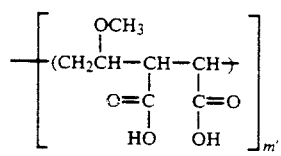

4. The polymer of claim 1 having the following units

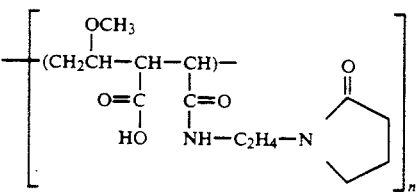

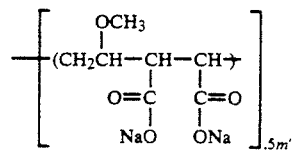

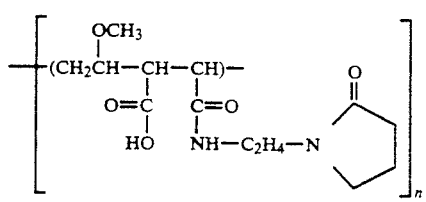

5. The polymer of claim 1 having the following units

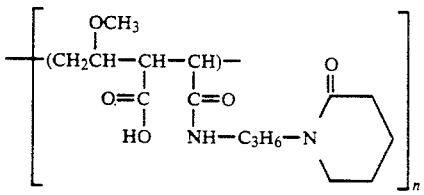

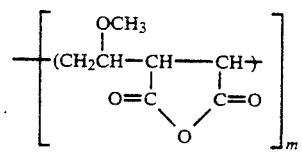

6. The polymer of claim 1 having the following units

[structures for claim 6]

7. The polymer of claim 1 wherein the ratio of n to m, m' or m" is 3:2.

8. The polymer of claim 1 wherein the ratio of n to m, m' or m" is 4:1.

* * * * *